US011579686B2

(12) United States Patent
Schmidt et al.

(10) Patent No.: US 11,579,686 B2
(45) Date of Patent: Feb. 14, 2023

(54) METHOD AND DEVICE FOR CARRYING OUT EYE GAZE MAPPING

(71) Applicant: APPLE INC., Cupertino, CA (US)

(72) Inventors: Eberhard Schmidt, Teltow (DE); Martin Haller, Berlin (DE); Denis Williams, Krefeld (DE); Tobias Langner, Potsdam (DE)

(73) Assignee: APPLE INC., Cupertino, CA (US)

( * ) Notice: Subject to any disclaimer, the term of this patent is extended or adjusted under 35 U.S.C. 154(b) by 375 days.

(21) Appl. No.: 16/080,386

(22) PCT Filed: Mar. 6, 2017

(86) PCT No.: PCT/EP2017/055220
§ 371 (c)(1),
(2) Date: Oct. 1, 2018

(87) PCT Pub. No.: WO2017/153355
PCT Pub. Date: Sep. 14, 2017

(65) Prior Publication Data
US 2019/0073025 A1    Mar. 7, 2019

(30) Foreign Application Priority Data
Mar. 7, 2016  (EP) .................................... 16159036

(51) Int. Cl.
*G06F 3/01*       (2006.01)
*G02B 27/01*      (2006.01)
(Continued)

(52) U.S. Cl.
CPC ......... *G06F 3/013* (2013.01); *G02B 27/0179* (2013.01); *G06F 3/012* (2013.01);
(Continued)

(58) Field of Classification Search
None
See application file for complete search history.

(56) References Cited

U.S. PATENT DOCUMENTS

| 7,742,623 | B1 * | 6/2010 | Moon ................ | G06K 9/00228 382/103 |
| 2004/0088726 | A1 * | 5/2004 | Ma ..................... | G06K 9/00711 725/46 |

(Continued)

FOREIGN PATENT DOCUMENTS

| EP | 2499963 A1 | 9/2012 |
| EP | 2879018 A1 | 6/2015 |
| WO | 2015187294 A1 | 12/2015 |

OTHER PUBLICATIONS

International Preliminary Report on Patentability for PCT/EP2017/055220 dated Sep. 11, 2018.

(Continued)

*Primary Examiner* — Hung Q Dang
(74) *Attorney, Agent, or Firm* — Fernando & Partners, LLP (57) ABSTRACT

The invention relates to a device and a method for performing an eye gaze mapping (M), in which at least one point of vision (B) and/or a viewing direction of at least one person (10) in relation to at least one scene recording (S) of a scene (12) viewed by the at least one person (10) is mapped onto a reference (R). At least a part of an algorithm (A1, A2, A3) for performing the eye gaze mapping (M) is thereby selected from multiple predetermined algorithms (A1, A2, A3) as a function of at least one parameter (P), and the eye gaze mapping (M) is performed on the basis of the at least one part of the algorithm (A1, A2, A3).

22 Claims, 4 Drawing Sheets

(51) Int. Cl.
- *G06Q 30/02* (2023.01)
- *G06T 7/194* (2017.01)
- *G06T 7/20* (2017.01)
- *G06V 20/20* (2022.01)
- *G06V 20/00* (2022.01)
- *G06V 40/19* (2022.01)
- *H04N 13/344* (2018.01)
- *G06Q 30/0251* (2023.01)
- *G06T 15/20* (2011.01)
- *G02B 27/00* (2006.01)
- *G06V 10/28* (2022.01)
- *G06F 18/24* (2023.01)

(52) U.S. Cl.
CPC ......... *G06Q 30/0261* (2013.01); *G06T 7/194* (2017.01); *G06T 7/20* (2013.01); *G06T 15/205* (2013.01); *G06V 20/20* (2022.01); *G06V 20/35* (2022.01); *G06V 40/19* (2022.01); *H04N 13/344* (2018.05); *G02B 27/0093* (2013.01); *G02B 27/017* (2013.01); *G02B 2027/0187* (2013.01); *G06F 18/24* (2023.01); *G06V 10/28* (2022.01)

(56) References Cited

U.S. PATENT DOCUMENTS

| | | | | |
|---|---|---|---|---|
| 2009/0052728 | A1* | 2/2009 | Blonde | H04N 5/913 382/100 |
| 2012/0134543 | A1* | 5/2012 | Fedorovskaya | G02B 27/017 382/107 |
| 2013/0050574 | A1* | 2/2013 | Lu | G06K 9/00751 348/441 |
| 2014/0003711 | A1* | 1/2014 | Ngan | G06T 7/11 382/164 |
| 2014/0003738 | A1* | 1/2014 | Williams | G06K 9/0061 382/282 |
| 2015/0092983 | A1* | 4/2015 | Nguyen | G06F 3/013 382/103 |
| 2015/0243036 | A1* | 8/2015 | Hoffmann | A61B 3/113 382/103 |
| 2016/0005176 | A1* | 1/2016 | Nguyen | G06F 3/013 382/103 |
| 2016/0012627 | A1 | 1/2016 | Kishikawa et al. | |
| 2016/0026245 | A1* | 1/2016 | Mantiuk | G06T 7/215 382/103 |
| 2016/0274659 | A1* | 9/2016 | Caraffi | G06F 3/013 |
| 2016/0291690 | A1* | 10/2016 | Thorn | H04N 5/232 |
| 2017/0038835 | A1* | 2/2017 | Algotsson | G06F 3/005 |
| 2017/0140224 | A1* | 5/2017 | Wilson | G02B 27/0093 |
| 2017/0242481 | A1* | 8/2017 | Lu | G06F 3/013 |
| 2019/0011921 | A1* | 1/2019 | Wang | G05D 1/0094 |

OTHER PUBLICATIONS

International Search Report for PCT/EP2017/055220 dated May 17, 2017.

* cited by examiner

METHOD AND DEVICE FOR CARRYING OUT EYE GAZE MAPPING

The invention relates to a method for carrying out eye gaze mapping, in which at least one point of vision and/or a viewing direction of at least one person, in relation to at least one scene recording of a scene viewed by the at least one person, is mapped onto a reference. Furthermore, a device for performing an eye gaze mapping also belongs to the invention.

Such eye gaze mappings, which are also referred to as viewing direction mapping or point of vision mapping, are used in many fields. For example, consumer research or the implementation of studies represents one such field of application. For this purpose, eye trackers, e.g., head-mounted eye trackers, may be used that determine the viewing directions of a test person while this test person observes a specific scene, e.g., their real environment or a display on a monitor. Furthermore, a scene camera may be attached to such a head-mounted device, which scene camera meanwhile makes recordings of the environment of the test person that cover at least a majority of the current field of view of such a test person. For a specific point in time, the gaze data determined by the eye tracker at this point in time can thereby be placed in relation to such a scene recording taken at this point in time, and, from this, it can be determined what the test person viewed at this point in time in relation to her environment. Such a procedure can then be performed for an entire scene video, such that every single scene capture of this scene video then contains a corresponding point of vision or even a viewing direction of the test person. In this way, it can be established where, how long, or how often a test person viewed specific objects in her environment during this experiment or this study. For example, based upon such test results, it may be determined which products stimulate more attention and which less on a supermarket shelf, which advertisement draws the gaze of test persons more strongly and which less etc. Such experiments are thereby typically performed not only with a single test person, but rather with numerous different test persons, e.g., of different age groups, genders etc., in order to obtain statistically significant results from the outcomes. The same experiment may also be performed multiple times with the same test person in order to detect a chronological variation, a learning behavior, or a progression.

However, since a manual evaluation of such numerous scene videos with corresponding gaze data is very complicated, there is the possibility of also performing such an evaluation automatically or of at least simplifying said evaluation. Eye gaze mappings are thereby used. It is thereby enabled, for example, to map all points of vision contained in a scene video to a single common reference—for instance, a reference image. For example, if a test person views a specific shelf with various products from various perspectives during the experiment, a recording of this shelf may thus be provided as a reference, for example. All points of vision recorded with reference to the scene video of this shelf may then be mapped to this single reference recording with the shelf. A markedly better impression as to which objects on the shelf were viewed frequently or less frequently can hereby be obtained. Such an eye gaze mapping may thereby also take place across test persons, such that the viewing results of all test persons are mapped to a common reference. In addition to this application example, however, there are numerous additional application possibilities for eye gaze mappings that map the points of vision and/or viewing directions with regard to a scene recording to a reference.

Specific algorithms may be used for automatically performing such eye gaze mappings. For example, such an algorithm references the scene recording with the reference recording and, for example, determines from this a transformation which maps the scene recording—that, for example, was recorded of one scene from a defined or even variable perspective—to the reference, which likewise was recorded of this scene, but from a different viewing angle. This determined transformation is subsequently applied to the point of vision determined with regard to the scene recording, which yields the correspondingly mapped point of vision with regard to the reference. However, such eye gaze mappings may also be executed differently, depending upon the application. For example, algorithms may also be used which perform image analyses, and therefore accompanying object detection and/or object classifications. Such an algorithm may, for example, detect and/or classify in a scene recording an object on which a point of vision is located, and assign the correspondingly identified object to the reference.

However, due to the various fields of application, the requirements for such eye gaze mappings are starkly different, such that a method operating according to a specific algorithm for performing such an eye gaze mapping in a specific situation is not also automatically suitable for performing an eye gaze mapping in a very different situation. Depending upon the situation, more or less good outcomes result, or even no outcomes at all, depending upon the situation.

Therefore, it is the aim of the present invention to provide a method and a device for performing an eye gaze mapping via which improved results can be achieved in the most comfortable manner possible.

This aim is achieved via a method and a device for performing an eye gaze mapping with the features according to the respective independent claims. Advantageous embodiments of the invention are the subject matter of the dependent patent claims, the description, and the Figures.

According to the method according to the invention for performing an eye gaze mapping, in which at least one point of vision and/or a viewing direction of at least one person, e.g., a test person or a user, with regard to at least one scene recording of a scene observed by at least one person is mapped to a reference, at least one part of an algorithm for performing the eye gaze mapping is selected from multiple predetermined algorithms as a function of at least one parameter, and the eye gaze mapping is performed on the basis of the at least one part of the algorithm.

This advantageously enables an algorithm or even only a part of an algorithm to be selected from multiple different algorithms for the performance of an eye gaze mapping, whereby numerous different situations and requirements can advantageously be considered. In particular, this consideration may take place via the at least one parameter, which may advantageously be used in order to specify different situations, requirements, or conditions in connection with the eye gaze mapping. In addition to this, the selection of the at least one part of the algorithm from multiple different algorithms may advantageously take place automatically, such that an especially high level of operating comfort is provided for a user or operator who would like to perform such an eye gaze mapping. In particular, such a user does not need to have any expertise whatsoever with regard to various algorithms and their advantages and disadvantages with regard to respective situations. The algorithm selection may therefore be performed by a device that therefore also ultimately improves the results of such an eye gaze mapping, via the improved possibilities of adaptation to the most varied situations.

What is thereby understood by an algorithm, such as the at least one part of the algorithm or the predetermined algorithms, is thereby, in general, an operating rule or implementation rule for performing at least one partial step of the eye gaze mapping. The implementation rule may thus relate to one or more partial steps of the eye gaze mapping. In addition to this, what may also be understood by the multiple different predetermined algorithms is an algorithm parameterized with at least one second parameter, wherein the determination of the at least one second parameter at various values is possible, and accordingly leads to different implementation rules. Furthermore, such implementation rules may, on the one hand, differ in their type, i.e., they describe different partial steps, as well as partial steps that are also identical in the chronological order. Accordingly, what may then also be understood by the selection of the at least one part of the algorithm is the determination of the at least one second parameter at a specific value. In addition to this, the selection of the at least one part of the algorithm may take place as a function of the (first) parameter according to a predetermined rule, e.g., a look-up table or a predetermined association which associates one of the multiple predetermined algorithms with a parameter value of the at least one parameter, in particular, also establishes a parameter value of the at least one second parameter of a parameterized algorithm or—in the event of multiple (first) parameters—associates a respective parameter value combination of the parameters with one of the predetermined algorithms, in particular, also establishes a parameter value of the at least one second parameter of a parameterized algorithm.

For example, if a specific first algorithm or at least part of an algorithm is selected, as a function of the parameter, from the multiple algorithms in a first situation, and a specific second algorithm or at least part of an algorithm is selected in a second situation, the eye gaze mappings resulting from these differ in at least one partial step and/or in a chronological order of partial steps.

The scene that is viewed by the person may represent a real environment of the person or even a virtual environment that is, for example, observed with VR (virtual reality) glasses, or an image displayed on a display device, or also a superposition upon the real environment of virtual/digital image contents, e.g., in an observation of the scenes with AR (augmented reality) glasses.

The at least one scene recording may accordingly relate to a recording of the scenes described above and, for example, may represent a camera recording of the environment of the person, or that displayed on a monitor at a specific point in time, e.g., a screenshot. The at least one scene recording may thus represent a recording of a scene by means of one or more image sensors; a stereoscopic image sensor, possibly with depth data associated with images; a matrix of image sensors; at least one camera and additional data of one or more sensors; a 3-D scene detection in which a 3-D scene is described as a composition of objects and possible scene background structure; and/or the detection of a fixed or chronologically varying stimulus (for instance, recording of screen contents). Data of a scene recording may also be related to one another in terms of time.

Viewing directions and/or terminal points of vision or points of vision may be present as part of the eye tracking data that are chronologically and/or spatially related to the scene recording, e.g., as a point of vision (POR) on a scene image and/or a terminal point of vision or a viewing direction in a 3-D scene. These gaze data may thereby be detected and provided by a mobile head-mountable eye tracker, or also by a remote eye tracker which is not head-mounted but, rather, is mounted on a display device such as a monitor, for example. This is advantageous particularly if the scene recording depicts a display shown on the display device, such that the gaze of the user with regard to the display may be detected especially simply by the remote eye tracker. For example, the scene recording then no longer shows the direct field of view of the user (which changes with head movements) but, rather, directly shows the presented stimulus, which may in turn represent an image, video, stereoscopic video, rendered 3-D scenes with objects, or even a composition, in the event of AR.

The reference may also be present in many different forms. For example, the reference may be a spatial representation/depiction, e.g., an image or a static 3-D scene; a spatiotemporal representation/depiction, e.g., a video or a dynamic 3-D scene; or a content-related/semantic representation/depiction, e.g., as categories/classes of objects detected as a data structure; or, for instance, as a graphical or three-dimensional depiction of specific or prototypical objects. The reference preferably agrees in terms of contents—temporally and/or spatially—with at least one part of the scene.

Such a reference may also have been taken from a scene recording or one of the scene recordings. A reference may also be a spatial, temporal, or spatiotemporal detail of a scene recording. A reference may, in its respective form (as listed above for scene recordings), have been made with external means, and therefore independently of an eye tracker.

Furthermore, the eye gaze mapping may be determined per discrete time step of a scene recording (for instance, image-by-image of an image sequence) or for a time interval. The time interval may, for example, correspond to a gaze event—for example, a fixation.

Since, as described, there are very many different possibilities as to in which form scene recording, gaze data, and reference may be present, it is particularly advantageous to select the at least one part of the algorithm as a function of the at least one parameter for the eye gaze mapping since, advantageously, all of these different situations can thereby be considered, and therefore optimal results may be achieved.

Therefore, in a particularly advantageous embodiment of the invention, input data are therefore provided that include data relating to the at least one scene recording, data regarding the determined point of vision and/or the determined viewing direction, and data regarding the reference, wherein the at least one part of the algorithm is chosen as a function of an analysis of at least one part of the input data as the at least one parameter.

This advantageous embodiment of the invention is based upon the realization that these input data directly contain numerous items of information that are suitable for characterizing specific requirements, situations, or conditions, and, accordingly, for selecting an algorithm optimized for these conditions. For example, information about the types of scene recording listed above, the reference, and the gaze data can be related on the basis of these input data, which information may advantageously be used for algorithm selection. While all of the cited input data are used for the eye gaze mapping, however, the analysis may also relate to only a portion of the input data, e.g., only to the image data of the scene recording or of the reference, or only to some of the scene recordings or the gaze data in the form of a random analysis.

In a further advantageous embodiment of the invention, data are provided that relate to a plurality of scene recordings with, respectively, at least one associated point of vision and/or an associated viewing direction as part of the input data. Therefore, the analysis of the input data may advantageously relate not only to an individual scene recording but also to multiple scene recordings, e.g., as part of a scene video, which analysis—not only via the multiple scene recordings—provides more possibilities of relating information about specific conditions or situations, in order to provide from this a suitable adaptation via the selection of a suitable algorithm; rather, the scene recordings also enable, via comparisons among one another, the provision of additional information that may advantageously be used for selection of a suitable algorithm. Examples of this are explained in detail in the following. The points of vision and/or viewing directions that are respectively associated with the scene recordings thereby do not necessarily need to relate to the same person. Scene recordings with respective associated points of vision and/or viewing directions of different persons may also be provided.

It thereby represents an advantageous embodiment of the invention if, in the analysis of the at least one part of the input data, these are analyzed as to at least one of the following aspects:

whether the scene represents a static scene or moves and/or contains varying objects;

in the event that the scene is moving and/or contains varying objects, which objects of the scene represent the moving and/or varying objects;

whether the scene has a background that is spatially and/or temporally unchanging or a background that varies spatially and/or temporally;

level of the image quality of the scene recordings and/or of the reference extent of a content-related agreement between the reference and the scene;

type of the scene recording and/or the reference and/or the points of vision and/or viewing directions and/or type of objects of the scene;

dimension of the scene recording and/or the reference and/or the points of vision and/or the viewing directions and/or type of objects of the scene; and whether the scene includes one or more objects that are classified as relevant or not, relative to other objects of the scene, and at least one result of the analysis is provided, as a function of which the at least one part of the algorithm is selected as the at least one parameter.

The information about whether a scene represents a static scene or a moving scene, or contains moving or varying objects, is in this respect relevant, as algorithms, that, for example, are not designed to detect such varying objects or to take them into account in the referencing of scene recording and a reference recording, in such an instance, also lead to poor results with regard to the eye gaze mapping. For example, if it is thus established in the analysis that the scene represents a static scene and contains no moving or varying objects, a simple and fast algorithm for the eye gaze mapping may be chosen, for example, whereas, for the other instance, an algorithm may be chosen that also takes into account moving objects in the eye gaze mapping and accordingly in such a situation leads to better and more reliable results with regard to the eye gaze mapping. Accompanying this, in the event that the scene is moving and/or contains varying objects, it is also advantageous to analyze the input data as to which objects of the scene represent the moving and/or varying objects. Such information can be determined very simply from the data relating to the scene recordings. In particular, it is thereby particularly advantageous if multiple scene recordings are provided, since this information about moving objects or varying objects in the scene can be obtained in a simple manner via a comparison between several such scene recordings. It is likewise advantageous to analyze the input data as to whether the scene has a background that is spatially and/or temporally changing or a background that does not vary spatially and/or temporally. For example, if a scene has an unchanging, static background that, in particular, is also not relevant to the related experiment, this background may be ignored in the eye gaze mapping, e.g., in the referencing between scene recording and reference, which results in a pronounced time savings, since the image data relating to the background do not need to be analyzed and mapped or examined. If it is known, in addition to this, that the background does not change, this may also be distinctly more simply identified as such in respective scene recordings—for example, using its color. For example, if the background represents a white wall, this is especially simple to identify in a respective scene recording, and can be ignored in the further processing of the scene recording for performing the eye gaze mapping. Points of vision on such an irrelevant background then also do not need to be considered at all and also do not need to be mapped, which, overall, enables a marked increase in efficiency in the eye gaze mapping. For example, in such an instance a very simple algorithm may thus in turn be selected that, in the event that the background varies neither spatially nor temporally, an identification of this is possible with very simple image processing means [sic]. By contrast, if the background changes spatially or temporally, accordingly more complex algorithms may be used that are designed to identify the background as such, even in the event of a spatial or temporal variation of said background. For example, the scene recordings that were recorded from different perspectives may be used in order to determine which objects in these recordings are located in the foreground and which in the background, or which represent the background. For example, the parallaxes of objects with reference to the background may be used for this. The information about whether the background changes spatially and/or temporally or not thus also represents a suitable parameter for selection of at least the part of the algorithm in order to ultimately markedly improve the implementation of the eye gaze mapping and its results.

In the same manner, it is also advantageous to analyze whether the scene includes one or more objects that are classified as relevant or not, relative to other objects of the scene. For example, if only some objects in a scene are relevant to the ultimate result of the eye gaze mapping or its evaluation, algorithms may be used that operate selectively and, for example, do not at all map points of vision on irrelevant objects. A large time advantage in point of vision mapping can also thereby be achieved. Whether such relevant or irrelevant objects are present in the scene may be determined via analysis of the point of vision data or viewing direction data in relation to the scene recordings, for example. Objects in the scene that are observed especially often may thus be classified as particularly relevant, whereas objects that are not observed at all may be classified as irrelevant. In order to classify objects with regard to their relevance, their movement, or even with regard to other criteria, corresponding object detection and object classification methods may be applied, for example. The type of objects or their classification may therefore also be used advantageously in order to select the at least one part of the algorithm, and therefore to provide an optimal situation adaptation that markedly improves the result of the ultimate eye gaze mapping.

The level of the image quality of the scene recordings and/or of the reference may, for example, also represent an additional parameter for selection of the at least one part of the algorithm may. For example, if scene recordings are ambiguous, e.g., due to excessively fast movement of the scene camera, or if scene recordings have a poor image quality for other reasons, correspondingly more robust algorithms may thus be used which, for example, are based upon more complex image analysis methods in order to still provide optimally good results with regard to the eye gaze mapping, even for such poor image qualities. The same also applies in the event that a reference recording that may then likewise have a poor image quality represents the reference. For example, if scene recordings or the reference have a very high and good image quality, correspondingly less robust and therefore more quickly operating algorithms may be chosen for the eye gaze mapping.

However, the reference may be present not only as an image recording; rather, it may assume many different forms, as was already mentioned. What is known as a symbolic image may also represent a reference or a reference image. Specific objects are depicted symbolically or schematically in such a symbolic image. For example, a symbolic or diagrammatic or schematic bottle may be depicted in such a symbolic image, and it should now be established whether or how often a person views bottles present in the scene. A point of vision, with regard to such a scene recording, that rests upon a bottle may be accordingly associated with the symbolic image of the bottle as a reference. Registration methods that can register various recordings from different perspectives with one another are unsuitable for producing such an eye gaze mapping, for example, since now the reference is a symbolic image. In such an instance, for example, algorithms may be used that are based upon object detection and object classification. Such an algorithm may, for example, classify the symbolic bottle depicted on the reference as a bottle, and accordingly search in the scene recordings for objects that were likewise classified as a bottle. Accordingly, it may then be checked whether points of vision or also viewing directions rest upon such objects classified as a bottle. However, a reference does not necessarily need to be an image; an object list which includes various object classes may also represent a reference. Algorithms may accordingly be used in turn that analyze scene recordings as to whether objects are located therein that can be classified as the objects predetermined according to the reference, and associate corresponding points of vision on such classified objects with the corresponding object classes of the reference. As described, there are also various types of scene recordings. Such scene recordings may be represented by an image recorded with a camera, but they may also represent the display on a monitor, so to speak as a kind of screenshot; they may be represented by the recording of a virtual presentation, e.g., via virtual reality glasses, the recording of a computer-generated scene from a specific current perspective of the person, or also a superposition made of up image recording of an environment of the user, recorded by means of a camera, with digital image contents, for example in AR glasses. What is thereby to be understood by a recording, in particular in connection with a computer-generated scene or digital image contents, e.g., on a computer-generated virtual scene, is thereby not necessarily a recording by means of a camera or the capture or storage of a currently displayed 2-D or 3-D image of the scene, but rather also, for example, the recording of the scene data of the entire computer-generated scene, e.g., via storage or provision of the scene data of the computer-generated scene together with the determination of a virtual point of view that defines the view or perspective of the person towards the currently displayed virtual scene. For example, a 3-D pose of the person and/or the viewing direction may be recorded to determine the current perspective, depending upon which of these parameters produces a variation in the perspective of the scene. In typical VR applications with VR glasses, for example, a person may look around in the virtually depicted scene by moving her head, and thereby vary the view and therefore the perspective of the scene. Such head movements may likewise be recorded accordingly, in particular together with the corresponding viewing direction of the person at this point in time, such that these data define the virtual perspective of the virtual scene. This may also be understood as a scene recording.

The same also applies, in turn, to the reference; this may likewise include VR or AR image contents, represent a scene of a computer-generated graphic, or represent the display on a monitor. In addition to this, the reference may be provided as a single reference recording or also as a reference video. Corresponding suitable algorithms for the performance of the eye gaze mapping may now, advantageously, also be selected for all of these different types of scene recordings and references. It is also advantageous to select the at least one part of the algorithm as a function of whether, in the eye gaze mapping, a point of vision or multiple points of vision shall be mapped to the reference, or whether viewing directions are to be mapped. The dimension of the scene recordings and/or of the reference and/or of the points of vision and/or viewing directions also represents an additional criterion for the selection of the at least one algorithm part. In particular, scene recordings, reference, objects in scene recordings and/or reference, points of vision and/or viewing directions may, in general, be two-dimensional or even three-dimensional. The extent of a content-related agreement between the reference and the scene may also be used as a parameter for selection of the at least one part of the algorithm. For example, the reference may represent one scene recording of the multiple scene recordings If nothing has changed in the scene during the scene recordings, at least the portions of the scene recording that include the reference recording agree completely in terms of content. However, there are also situations, in which a reference is initially provided, e.g., in the form of a schematic drawing or diagram, or also in the form of a computer-aided design, which then should be reconstructed or modeled as real scenes. In such an instance, deviations may occur between the real scene and the reference; for example, it may then occur that objects in the real scene do not have the same distances or positions as in the reference. More robust algorithms are, again, suitable in the latter instance for achieving better results in the eye gaze mapping, whereas simpler and faster algorithms may, again, be used given a good agreement between scene or corresponding scene recordings and reference. Image analysis methods may in turn be used to determine whether and how well scene recordings agree with the reference. Such individual scene recordings may be compared with one another, as well as with the reference, the reference recording, or the reference image.

According to a further advantageous embodiment of the invention, in the analysis of the input data, the type of data relating to the scene recordings and/or the reference and/or relating to the points of vision and/or viewing directions is determined—in particular, with regard to data type, data structure, data format and/or file format—in order to determine from this the type and/or dimension of the scene recordings and/or reference and/or the points of vision and/or viewing directions. For example, whether the scene recording is the recording of a camera image or a computer-generated graphic or the like, whether the scene recording is two-dimensional or three-dimensional, whether points of vision are present as two-dimensional points or 3-dimensional points, whether point of vision data reflect points of vision or viewing directions, what type or dimension is involved in the reference etc., may be determined especially simply via the manner in which the data of these pertinent scene recordings, of the reference, and of the gaze data are present.

In a further advantageous embodiment of the invention, in the analysis of the input data, one or more of the scene recordings and/or the reference are analyzed with regard to their image quality and/or image contents. Numerous items of the aforementioned advantageous information that may be used for algorithm selection may be obtained automatically, via an analysis of the scene recordings and/or of the reference—in particular, of their image data. This may be produced particularly simply via image analysis methods. For analysis of the image quality, image recordings or images in general may be analyzed with regard to their brightness values, color, disparity, depth values, contrasts, contrast curves, contrast gradients, brightness curves, brightness gradients, color curves, color gradients, texture properties, disparity curves, disparity gradient, depth curves, depth gradients, saturation, saturation curves, noise components that may be determined via frequency analysis etc. For example, in the analysis of image contents, recognized (i.e., not necessarily also classified) objects may be compared with one another as to their positions—also, for example, across multiple recordings—in order, for example, to determine whether objects spatially and/or temporally vary, move, or the like. Objects may, accordingly, also be classified via such analyses.

Not all input data necessarily need to be analyzed in the analysis of the input data; this may also take place randomly, or only for a specific selection of the input data. For example, not all scene recordings necessarily need to be analyzed with regard to image quality and/or image contents; a sample may also be selected from these scene recordings and subsequently be analyzed in order to obtain the information described above. A great deal of time may, in turn, thereby be saved in the image analysis or, in general, in the data analysis of the input data. For example, it may also be provided that the analysis of the scene recordings be begun in a predetermined and/or random order, and the analysis of the input data may be ended insofar as the aforementioned information was determined sufficiently reliably—for example, according to a defined criterion. For example, if it already emerges from the analysis of two or three scene recordings that the scene contains moving objects, an additional analysis of the additional scene recordings may be disregarded under this aspect.

However, alternatively, all input data or all scene recordings may be analyzed. In addition to this, it is also possible to separately select a respective part of the algorithm for the eye gaze mapping that is to be performed on the basis of a respective scene recording. For example, for this, the scene recordings may also be classified in groups with regard to the aforementioned aspects, and for these groups a respective suitable algorithm may accordingly be used to perform the eye gaze mapping. For example, it may occur that some scene recordings have no moving objects, whereas others do. It may also be that some of the scene recordings have a static and/or homogeneous background, whereas this does not apply to other scene recordings. The image quality of the scene recordings may also be different from scene recording to scene recording. This also applies in the same way to the reference. This advantageously enables targeted algorithms to be selected for a respective scene recording or scene group, whereby a markedly better situation adaptation, better results, and overall a greater time savings can be achieved. However, such a classification of scene recordings into groups may take place not only with regard to the aforementioned aspects but, rather, also, alternatively or additionally, with regard to temporal criteria.

Therefore, it is an additional advantageous embodiment of the invention if a respective scene recording is associated with one of multiple time interval groups, wherein the selection of the at least one part of the algorithm for performing the eye gaze mapping, as a function of the at least one parameter, is implemented separately for a respective time interval group. In particular, the time interval groups thereby represent various gaze event time intervals—in particular, with regard to fixations; and/or analysis time intervals; and/or recording time intervals; and/or experiment time intervals; and/or study time intervals. A study thereby typically comprises one or more experiments; an experiment may include one or more recordings; a recording may include one or more analysis time intervals; and an analysis time interval may in turn include one or more gaze events. For example, a fixation represents such a gaze event. In a fixation, the eye remains on a specific point for a longer—in particular, characteristic—duration. Such a fixation may also be present in the form of a moving fixation, in which the eye follows a moving object, for example. The movement of the eye during such a moving fixation thereby typically takes place continuously. What is known as a saccade represents an additional gaze event, for example. During such a saccade, the eye jumps from one fixation to the next. In this time period, the eye is not capable of receiving, or the visual information received by the eye is not relayed or processed further by the brain. Gaze data that pertain to such a saccade are also, accordingly, irrelevant, since a person does not actively view an object in the environment or relative to the scene during such a saccade. Furthermore, a saccade typically follows a ballistic movement. Using the gaze data—in particular in terms of their time curve—such gaze events may be identified using the cited characteristics, i.e, characteristic durations and movement curves that may be detected by means of the eye tracker.

For example, this embodiment of the invention enables the at least one part of the algorithm to be separately selected for the eye gaze mapping of points of vision or viewing directions that are associated with an individual fixation, and the at least one part of the algorithm to, in turn, be newly or separately selected for additional gaze events, i.e., additional fixations etc. This also enables an especially differentiated situation adaptation. However, an analysis time interval may also represent an additional time interval group. However, during a recording, i.e., while the person assesses the scene and a scene video is thereby recorded, for example, there may be time intervals in which the person is distracted and, for example, does not at all look directly in the direction of the relevant contents of this scene. At the start or end of such a test, an initial instruction of persons or a subsequent review also typically takes place, while the scene camera records additional images that, however, are no longer relevant to the actual test. Multiple tests may also be performed, with intermediate reviews or the like. For example, a scene video may thereby be subdivided into relevant and irrelevant time segments—the analysis time intervals. Accordingly, a time interval in which the scene video has, for example, relevant image contents that should be analyzed represents an analysis time interval. The algorithm selection may accordingly also be performed separately for such a respective analysis time interval.

For example, the scene may also change from analysis time interval to analysis time interval, such that a separate algorithm selection is in turn particularly advantageous with regard to such a respective time interval and allows an optimal situation adaptation with optimal results.

For example, a time interval which relates to the entire video recording of a scene video thereby represents a recording time interval. An experiment may include multiple such recordings which, for example, were made for different persons or performed on different days. A separate algorithm selection may in turn also be performed for such a respective recording. The same, in turn, accordingly applies to the individual experiments of a study, as well as to different studies themselves.

In addition to this, the establishment of such time intervals may likewise be determined on the basis of an analysis of the input data. For example, the gaze event time intervals can be determined via analysis of the gaze data. Analysis time intervals may be established via a content-related analysis of the scene recordings. For example, start and end of a scene video determine a recording time interval. The remaining time intervals may be obtained from metadata, for example, that define which scene videos belong to an experiment and which experiments to a study, for example. The time intervals may, additionally or alternatively, also be manually established by a user.

In a further advantageous embodiment of the invention, metadata associated with at least a portion of the input data are provided, wherein the at least one part of the algorithm, as a function of at least one part of the metadata, is chosen as the at least one parameter. Auxiliary information corresponding to the individual input data may be provided via such metadata. Such metadata may thereby relate to the at least one scene recording and/or to the reference and/or to the points of vision and/or viewing directions and/or also the scene itself or to (known) objects of the scene. For example, such information may be a time stamp, or also date, time, site of the recording, technical data regarding scene recording or gaze capture, such as sampling frequency, frame rate or the like. Such meta-information may also be comments regarding scene recordings, regarding the recording overall, regarding individual point of vision data or the like, which comments have been manually added by a user, for example. Such meta-information may accordingly also be information regarding relevant objects in the scene recordings, information regarding occultations of relevant objects, object properties such as weight, material, value/price, rarity, reflectance, opacity, or the like. Metadata may also be present in form of a keyword. For example, scene recordings may contain a title, e.g., "shelf study" or "personal study," such that, as a function thereof, a suitable algorithm or at least a portion thereof may be chosen for the eye gaze mapping. For example, an algorithm for human interaction that is particularly suitable for face recognition, recognition of eyes, gestures or the like may be chosen for character studies. Such continuative information provided via metadata, which information goes beyond mere image data of the scene recordings and the reference and the pure gaze data, may advantageously be used in order to further optimize the algorithm selection. Such meta-information or metadata may also establish the time intervals described above, for example.

In a further advantageous embodiment of the invention, at least one user input is detected, and the at least one part of the algorithm, as a function of the detected user input, is chosen as the at least one parameter. This has the great advantage that auxiliary information may also be provided by the user of the device himself, in order to even further optimize the algorithm selection. For example, here the possibility of making additional specifications regarding, for example, the experiment or the study, the scene, relevant objects or the like is provided by the user. For example, the field of application or an objective or question or goals may also be specified. For example, for some tests, it may only be relevant to establish whether a user gazes at a specific object or not, or upon which of several objects a user gazes, wherein it is thereby insignificant precisely where on this object the user gazes. In other tests, however, it may be relevant to also precisely establish towards which precise region of an object a person directly gazes. In the second instance, correspondingly more precise and accurate eye gaze mapping algorithms may be used, whereas, in the first instance, simpler algorithms with lower precision may be chosen, for example, or algorithms operating on the basis of object recognition. However, a user input may also be used in the course of a directed algorithm selection. For example, the device may already make a pre-selection with regard to the provided, predetermined algorithms via pre-analysis or via analysis of the input data with regard to at least one of the aforementioned aspects and—for example, using the information automatically obtained by the device—may exclude specific algorithms for use in the eye gaze mapping and, in turn, consider others. These selected and considered algorithms may, for example, be provided to a user for selection, so that this user no longer needs to select from all possible algorithms but rather merely from a small number. In the course of the selection process, requests may also be output to the user to make more detailed specifications regarding the situation, the input data, the application or the like. The algorithm selection may therefore guide a user with suggestions, automatically or in stages. In addition to this, it is possible that the input data are initially analyzed for the aspects described above, and if it should thereby be established, for example, that the analysis with regard to some of these aspects has led to no result or an insufficiently certain result, the device may output a corresponding question to the user, e.g., as to whether the scene contains moving objects or whether the moving objects in the scene represent relevant objects. The user may also make specific requirements or set criteria for the eye gaze mapping, as will be described in detail in the following.

In a further advantageous embodiment of the invention, at least one of multiple steps required to perform the eye gaze mapping is implemented on the basis of at least a first of the predetermined algorithms, and a result of the implementation is provided, as a function of which the at least one part of the algorithm is chosen as the at least one parameter. This also advantageously enables the results of previously implemented steps of the eye gaze mapping or specific intermediate results to be used in order to select the at least one part of the algorithm. Specific partial steps of the eye gaze mapping may also be implemented, and the result may be analyzed for its quality or grade. Should such partial steps lead to poor results, a new part of the algorithm may be selected, and this method step may be performed or repeated with the newly selected algorithm. Intermediate results and partial results of algorithms executed previously or in parallel may thus also be used in order to ultimately select the at least one part of the algorithm. In addition to this, analysis steps for analysis of the input data, e.g., with regard to at least one of the aforementioned aspects, may thereby also themselves already represent part of the eye gaze mapping. Or, expressed otherwise, results of the analysis of the input data, e.g., of the analysis of the scene recordings, with regard to content or their image quality may then be used accordingly in order to select, for example, the part of the algorithm which is responsible for the mapping of the point of vision from a scene recording to the reference—in particular, using the results already obtained from the analysis. Results obtained in the analysis of the input data regarding detected and/or classified objects in the scene recordings or the reference may also be used for the eye gaze mapping, such that a separate image analysis no longer needs to be performed for the eye gaze mapping, or this may at least be implemented in a reduced manner.

The algorithm selection may also take place in the manner of a kind of control loop. For example, for some of the scene recordings, the eye gaze mapping may be performed according to a first selected algorithm and be reviewed as to whether the result corresponds to predetermined requirements, and, if not, a new selection of the algorithm may take place.

It is thereby particularly advantageous if it is determined whether or to what extent the result satisfies a first condition that is predetermined or can be predetermined by a user, and, as a function thereof, the at least one part of the algorithm is selected as the at least one parameter. For example, such conditions may be conditions of the quality or reliability of the ultimate result, or also of intermediate results; conditions of the time cost that should ultimately be applied for the eye gaze mappings; or the like. The time cost may, for example, thereby be determined via simple time measurement, e.g., for individual steps, and be extrapolated or estimated for the entire eye gaze mapping process, or be provided on the basis of experimental values for the time cost of individual algorithm. The quality of eye gaze mapping may also, for example, take place according to quality evaluations using one or more quality measures or quality classes, e.g., the parallel application by the same applicant with the title, "Verfahren und Vorrichtung zum Bewerten von Blickabbildungen" ["Method and device for evaluating eye gaze mappings"], submitted on the same application date.

According to a further advantageous embodiment of the invention, at least one boundary condition relating to a cost—in particular, a time cost—and/or a quality of a result of the implementation of the eye gaze mapping can be predetermined by a user, and the at least one part of the algorithm for performing the eye gaze mapping is chosen, as a function of the boundary condition, as the at least one parameter. Requirements of the user with regard to the quality to be achieved or the time cost may thus also be taken into account in the selection of the at least one part of the algorithm. For example, here, the user may, via corresponding priorities, determine and, for example, prespecify that the maximum quality should be achieved, regardless of the time cost. Conversely, it may also be predetermined by the user that the time cost for the eye gaze mapping or also for the algorithm selection should be kept as small as possible. For example, the user may select these criteria from two or more tiers, e.g., for the time cost of a low, medium, or high time cost, and/or require a low, medium, or high quality for the quality.

In a further advantageous embodiment of the invention, after performing the eye gaze mapping, it is determined, as a function of a result of the eye gaze mapping and as a function of a boundary condition, whether a new selection pertaining to the at least one part of the algorithm for repeated implementation of the eye gaze mapping is implemented on the basis of the at least one, newly-selected part of the algorithm. This is, in particular, especially advantageous when a condition of the quality of the result represents the boundary condition. If the result of the eye gaze mapping does not achieve a predetermined minimum quality or minimum grade, or a predetermined reliability, a corresponding new selection may thus be performed with consideration of the previous selection and results—in particular, until the boundary condition for the result is satisfied. This also advantageously enables simpler and faster algorithms to initially be chosen, and only if the result does not correspond to the desired requirements are accordingly more complicated or more precise algorithms to be chosen for the implementation of the eye gaze mapping and is the eye gaze mapping to accordingly be re-implemented.

In a further advantageous embodiment of the invention, at least a portion of intermediate and/or result data of the selection of the at least one part of the algorithm and/or of the implementation of the eye gaze mapping on the basis of the selected algorithm is stored and provided as at least one second parameter for a subsequent and repeated implementation of the eye gaze mapping, in which at least one part of the algorithm for implementation of the eye gaze mapping is selected—additionally, as a function of the at least one second parameter—from the multiple predetermined analysis algorithms.

The method may therefore represent a learning method, which may utilize already obtained results from previously implemented eye gaze mappings and corresponding selections of algorithms and their results in order to make decisions based thereupon for new implementation of the algorithm selection. For example, it may be that it has been established, based upon previous results of eye gaze mappings with specific algorithms, that this or that algorithm leads to especially good results for scene recordings with specific characteristics, e.g., moving objects, recordings in a room, recordings in nature, recordings with people, or the like. If, in a new implementation of the method, e.g., for a different experiment or a study, it is detected—for example, on the basis of the analysis of the scene recordings or portions thereof—that a similar situation is again present, the algorithms that have already been specified as suitable for this situation may be resorted to. Specific decisions or prior decisions—in particular, also with regard to boundary conditions—may thus be learned and/or optimized automatically.

Furthermore, the invention relates to a device for carrying out an eye gaze mapping, in which at least one point of vision and/or a viewing direction of at least one person, in relation to at least one scene recording of a scene viewed by the at least one person, is mapped onto a reference, wherein the device has a control device and a memory. Furthermore, multiple predetermined algorithms are stored in the memory, and the control device is designed to select at least one part of an algorithm for implementation of the eye gaze mapping from the multiple predetermined algorithms as a function of at least one parameter, and to perform the eye gaze mapping on the basis of the at least one part of the algorithm.

The advantages cited for the method according to the invention and its embodiments also apply to the device according to the invention. Moreover, the method steps cited in connection with the method according to the invention and its embodiments enable the development of the device according to the invention via additional objective features.

The control device for the device also belongs to the invention. The control device has a processor device that is set up to implement an embodiment of the method according to the invention, or one of its embodiments. For this, the processor device may have at least one microprocessor and/or at least one microcontroller. Furthermore, the processor device may have program code that is set up to implement the embodiment of the method according to the invention upon execution by the processor device. The program code may be stored in a data memory of the processor device.

Additional features of the invention result from the claims, Figures, and the description of Figures. The features and feature combinations cited in the specification, as well as the features and feature combinations named in the Figure description and/or shown solely in Figures, can be used not only in the respective indicated combination, but also in other combinations, without departing from the scope of the invention. Embodiments of the invention that are not explicitly shown and explained in the Figures, but arise via separate feature combinations from the explained embodiments and can be produced, are also to be considered as encompassed and disclosed. Embodiments and feature combinations are also to be considered as disclosed that thus do not have all features of an originally formulated independent claim. Moreover, embodiments and feature combinations are considered to be disclosed—in particular, via the embodiments presented above—that exceed or deviate from the feature combinations presented in the references of the claims.

Shown are.

The exemplary embodiment explained in the following is a preferred embodiment of the invention. In the exemplary embodiments, the described components of the embodiments represent respective features of the invention that are to be considered independently of one another, which features respectively also develop the invention independently of one another and therefore, individually or in a different combination than that shown, are also to be considered as components of the invention. Furthermore, the described embodiments can also be supplemented by additional features of the invention that have already been described.

In the Figures, functionally identical elements are respectively provided with the same reference characters.

Figure 1:
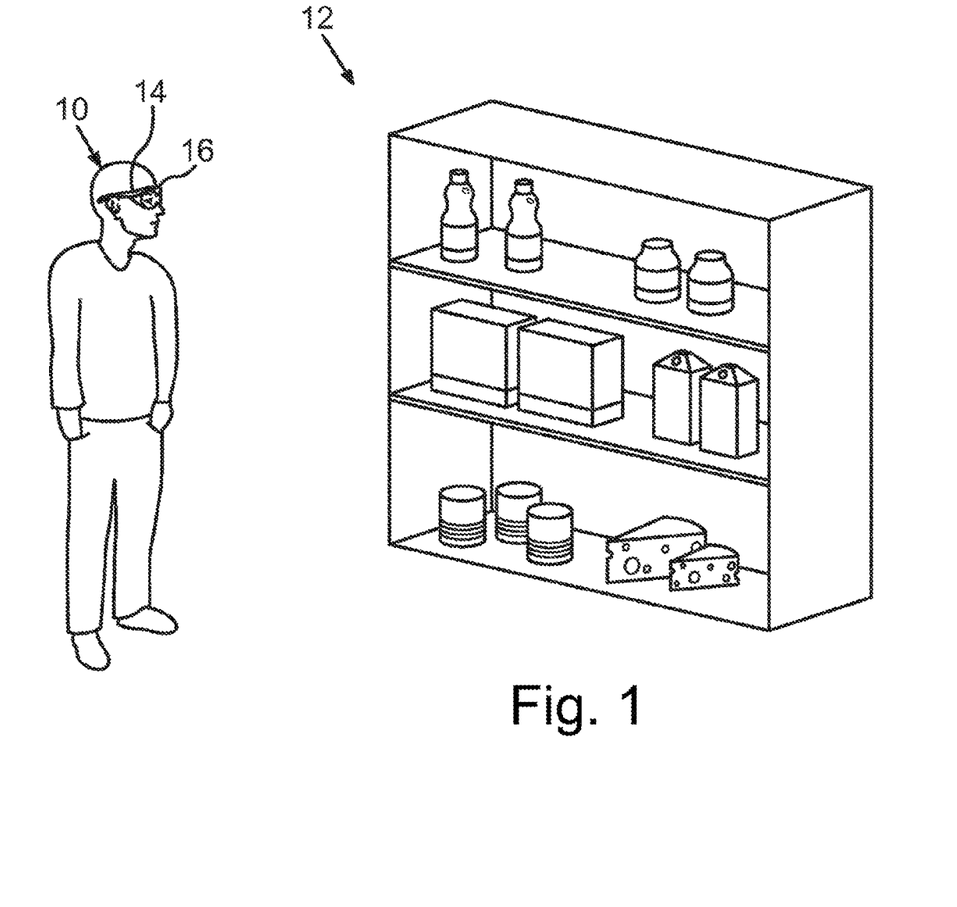
FIG. 1 a schematic depiction of a scene and a person viewing the scene.

FIG. 1 shows a schematic depiction of a person 10 who is directly observing a scene 12. The person 10 here wears glasses 14 with an integrated eye tracker which continuously records gaze data of the person 10 while the person 10 observes the scene 12. Furthermore, the glasses 14 have a scene camera 16 which likewise continuously records images of the scene 12 in the meantime. The detection of the gaze data is thereby chronologically matched to the recording of the scene images, or is or can be set in relation to this. For example, the detection of respective gaze data, or of viewing directions or points of vision of the person 10 that are determined from said gaze data, and the recording of a respective image may take place synchronously at a respective time step, or the detection of the gaze data as well as the image recordings may be provided with a time stamp so that a respective point of vision or a respective viewing direction may respectively be precisely associated with a scene recording. Such a scene recording S is thereby shown by way of example in FIG. 2 and FIG. 3.

Figure 2:
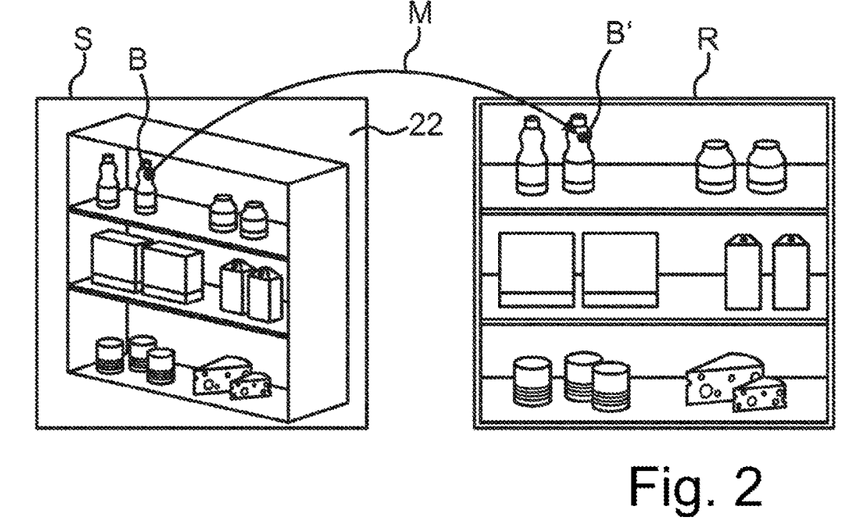
FIG. 2 a schematic depiction of a scene recording, with a point of vision relative to the scene recording and a reference, according to an exemplary embodiment of the invention.

FIG. 2 thereby shows a schematic depiction of a scene recording S of the scene 12 from FIG. 1, with a point of vision B of the person 10 which was determined on the basis of gaze data detected at the point in time of the scene recording S, and with a reference R to illustrate an eye gaze mapping according to an exemplary embodiment of the invention. The scene recording S here represents an example of a recording of the scene 12 that was made by the scene camera 16 at a specific point in time. Furthermore, a point of vision B associated with this scene recording S was calculated using the gaze data of the person 10 that was detected by the eye tracker, which here is likewise shown in the scene recording S. The reference R in this example likewise represents an image recording of the scene 12. For example, the reference R may represent one of the scene recordings S, a detail from one of the scene recordings S, or also a separately recorded image of the scene 12, e.g., also with a different camera than the scene camera 16 worn by the person 10. According to the eye gaze mapping M, the point of vision B in relation to the scene recording S is now mapped to a corresponding point of vision B' in relation to the reference R. Via such an eye gaze mapping M, in particular numerous points of vision B that are present in relation to numerous scene recordings S can be mapped to a common reference R, whereby the detected point of vision data can be made markedly more comparable, for example. Specific algorithms may be used in order to perform such an eye gaze mapping M. For example, such an algorithm may reference the scene recording S with the reference recording R, and determine from this a transformation which maps the scene recording S to the reference R. This determined transformation may subsequently be applied to the point of vision B determined in relation to the scene recording S, which accordingly delivers the correspondingly mapped point of vision B' on the reference R. The referencing between scene recording S and the reference R may, for example, take place on the basis of simple image analysis methods. Alternatively or additionally, methods for object detection and/or object classification may also be used.

In general, the scene recording S may be present in the most varied forms, e.g., as a 2-D recording or also as a 3-D scene recording that was recorded by means of a stereo camera, for example. It may also represent the recording of a purely virtual, e.g., computer-generated scene, or also the recording of an AR scene etc. The point of vision data may also be present in the most varied forms, e.g., as 2-D points of vision or as 3-D points of vision, or also as a 3-D viewing direction in a 3-D scene etc. The reference R may assume the most varied forms—in particular, also those described in relation to the scene recordings. Additional possibilities for the reference R are explained in detail using FIG. 3.

Figure 3:
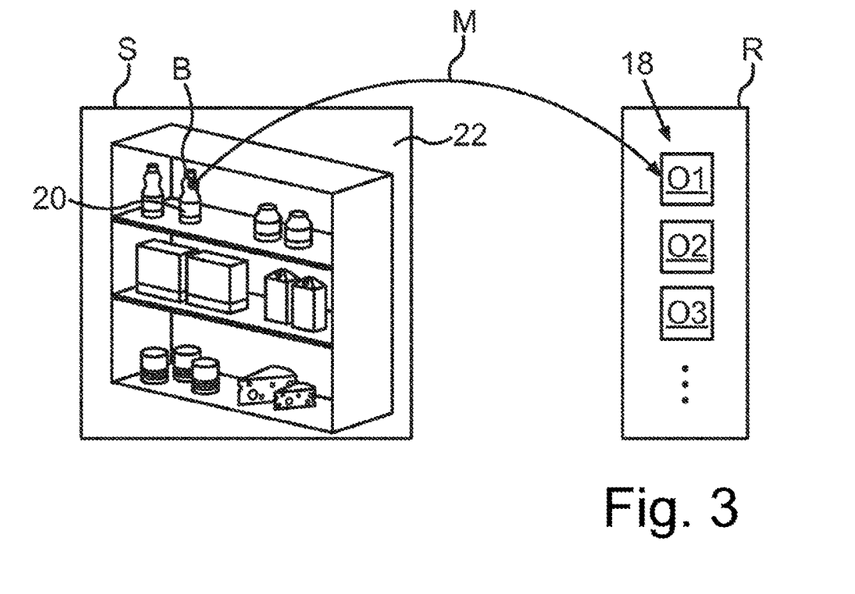
FIG. 3 a schematic depiction of a scene recording, with a point of vision relative to the scene recording and a reference, according to an additional exemplary embodiment of the invention.

FIG. 3 thereby in turn shows a schematic depiction of the scene recording S with the point of vision B associated with this scene recording S, as well as a reference R which here is present in the form of various defined object classes 18 which classify various objects. A first object class O1 may, for example, be related to bottles, a second object class O2 to cartons, a third object class O3 to food cans etc. Primarily algorithms that operate on the basis of object classifications are suitable for performing an eye gaze mapping M on the basis of such a reference R. For this, the scene recording S, for example, may be examined for objects of these object classes 18 and be reviewed as to whether a respective point of vision B present in relation to such a scene recording S is situated on an object which is associated with such an object class 18. If this is the case, as shown here in FIG. 3 for the point of vision B resting on the bottle 20, according to the eye gaze mapping M this point of vision B may thus be associated according to the first object class O1 for bottles.

From this, it is clear that procedures that are different and defined by corresponding algorithms are advantageous in the eye gaze mapping M, depending upon the situation, e.g., the type of scene recording S, the reference R, the dimension of the points of vision B or viewing directions etc.

However, not only may the type or dimension of scene recording S, reference R and point of vision B, or viewing direction be taken into account in order to achieve the best possible results; rather, numerous additional items of information are suitable, using which an algorithm or at least a portion of an algorithm for implementation of the eye gaze mapping M may be suitably selected. Such additional useful information is represented by, for example, information about whether the scene 12 depicts a static scene or contains moving or changing objects; the type of objects that are present in such a scene 12; whether the background 22 of the scene recording S depicts, for example, a spatially or temporally varying background or a static background 22; the quality of the scene recordings S; the extent of a content-related correspondence between scene recording S and reference R etc. All of these parameters are advantageously suitable for selecting an algorithm, optimized for a respective situation and defined conditions, for the implementation of the eye gaze mapping M, which is explained in detail using FIG. 4.

Figure 4:
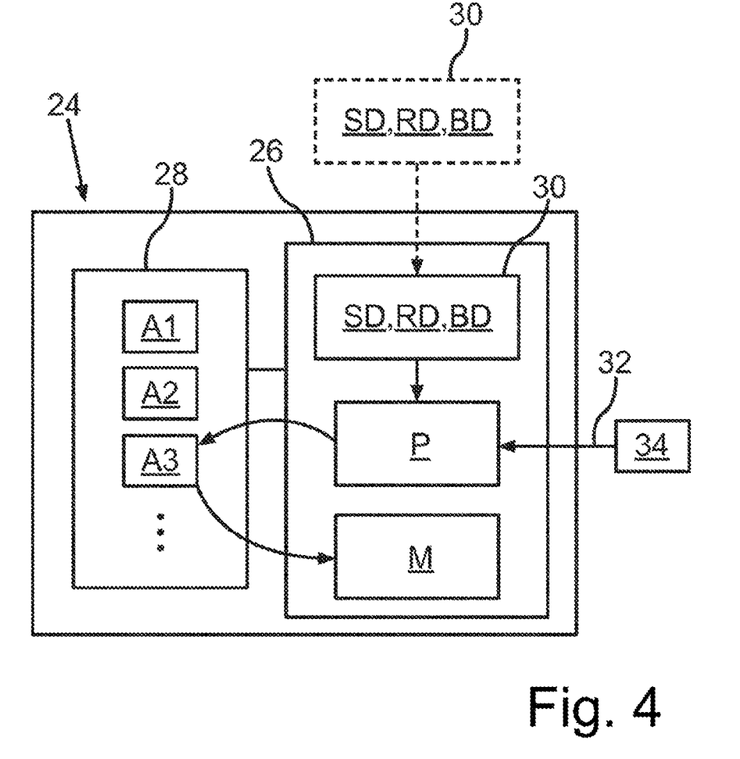
FIG. 4 a schematic depiction of a device for performing an eye gaze mapping according to an exemplary embodiment of the invention.

FIG. 4 shows a schematic depiction of a device 24 for performing an eye gaze mapping M according to an exemplary embodiment of the invention. The device 24 thereby has a control device 26 and a memory 28. Multiple predetermined algorithms A1, A2, A3 etc., for implementation of an eye gaze mapping M are stored in the memory 28. Furthermore, input data 30 are provided to the device 24, e.g., via a suitable interface, which input data comprise data relating to the scene recordings S, which here are referred to as scene data SD; data relating to the reference R, which here are referred to as reference data RD; and data relating to the points of vision B or viewing directions, which here are referred to as gaze data BD. On the basis of the provided input data 30, the control device 26 determines at least one parameter P, as a function of which at least one part of an algorithm is selected from the provided algorithms A1, A2, A3. The eye gaze mapping M is subsequently performed by the control device 26 on the basis of this selected part of the algorithm—in this example, the algorithm designated with A3. What can also be understood by the various algorithms A1, A2, A3 is an algorithm parameterized by one or more second parameters for which various parameter values of the second parameter have been established, such that, for example, the parameterized algorithm for a first parameter value of the second parameter represents the first algorithm A1, the parameterized algorithm for a second parameter value of the second parameter represents the second algorithm etc. According to this example, the algorithm selection thus establishes a parameter value of the at least one second parameter of the parameterized algorithm as a function of parameter P.

In the analysis of the input data 30, the scene data SD and/or the reference data R and/or the gaze data BD may be analyzed. These input data 30 may thereby be analyzed—in particular, as to whether the scene 12 represents a static scene 12 or contains moving and/or varying objects; which of the objects of the scene 12 represent moving and/or varying objects; whether the scene has a spatially and/or temporally changing background 22 or not; and also an extent of a content-related agreement between the reference R and the scene 12 or the scene recording S. The level of the respective image quality may also be determined on the basis of the scene data SD and/or of the reference data RD. Furthermore, the type of input data 30 may also be analyzed in order to establish, for example, whether the image data are present as 2-D data or 3-D data; whether the data relate to a computer-generated scene or were recorded by a camera; whether the reference R is present as an object class definition or likewise in the form of image data; whether the gaze data BD relate to a 2-D point of vision, a 3-D point of vision, and/or a viewing direction etc. In addition to this, together with the input data 30, metadata may also be provided which, in particular, may be set in relation to the scene data SD, the reference data RD, and the gaze data BD. All of this information may now advantageously serve as a parameter P, as a function of which the algorithm selection is performed. Overall, an algorithm for implementation of the eye gaze mapping M may be provided that is adapted to a respective situation, requirements, and conditions.

In addition to this, the device 24 may also have a user interface 32 via which user inputs 34 can be received by the device 24. Information may also be output via such an interface 32 from the device 24 to a user—for example, in order to request that this user make specific inputs. Such a user interface 32 may be provided in the form of a monitor, a keyboard, a touchscreen, a speech input device, or the like. Such additional user inputs 34 received by the device 24 may also advantageously be provided as a corresponding parameter for the algorithm selection. For example, a user may also establish specific boundary conditions for the algorithm selection, e.g., a quality of the result that is to be achieved or also a limitation of the time cost for the implementation of the eye gaze mapping. Additional specifications with regard to the field of application, a goal of the test, relevant objects, or the like may also be made by a user. They method thereby can achieve results that are more distinctly adapted to the situation and are thereby further improved.

Figure 5:
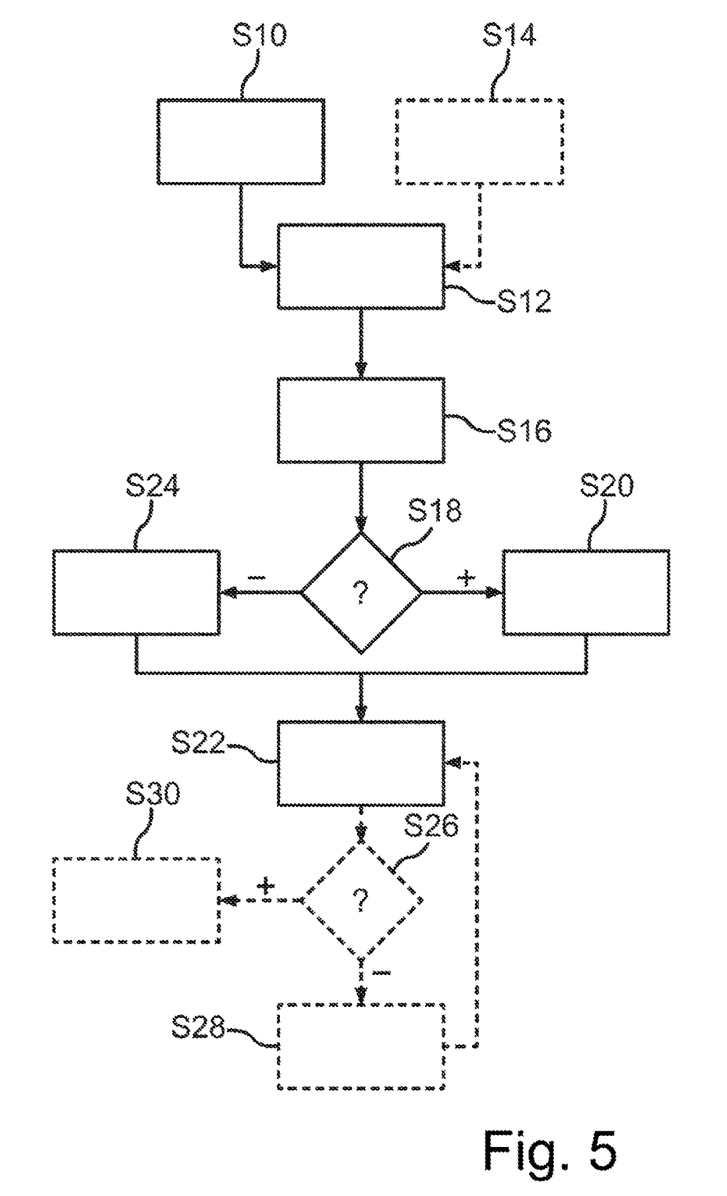
FIG. 5 a workflow diagram to illustrate a method for performing an eye gaze mapping according to an exemplary embodiment of the invention.

FIG. 5 shows a workflow diagram to illustrate a method for performing an eye gaze mapping M according to an exemplary embodiment of the invention. For this, in step S10, input data 30 are initially provided which are analyzed in step S12. Optionally, in step S14, a user input 34 may also be received, e.g., in order to establish specific boundary conditions and/or provide continuative information—for example, in relation to the type of application, the type of scene 12, or the like. As a function of the result of the analysis provided in step S12, in step S16, a pre-selection of algorithms may subsequently be made from multiple provided algorithms A1, A2, A3 that are suitable in the present situation, which was specified by the analysis result in step S12. Furthermore, in step S18, it may be checked whether, for example, an additional user input 34 has been received which supplies additional auxiliary information or, in turn, provides specific boundary conditions for the algorithm selection. If this is the case, in step S20 one of the algorithms provided in the pre-selection in step S16 is selected with consideration of this user input detected in step S18, and, in step S22, the eye gaze mapping M is performed on the basis of this selected algorithm. By contrast, if no additional user input 34 is received in step S18, an algorithm from the pre-selection in step S24 is selected independently of an additional user input 34, and in step S22 the eye gaze mapping M is performed on the basis of the algorithm selected in such a manner. It is here incorrectly [sic] made possible that the algorithm selection may both be implemented automatically, e.g., without any interaction by a user, or, on the other hand, may also guide a user in steps with suggestions, and the inputs input by the user may additionally be taken into account in the selection.

In an additional optional step S26, it may be checked, for example, whether the result of the eye gaze mapping M satisfies a predetermined criterion—for example, in relation to quality or grade. If this is not the case, in step S28, a new selection of the algorithm may be chosen—in particular, via selection of another of the pre-selection of the algorithms provided in step S16, and the eye gaze mapping M may be re-implemented in step S22. If the result of the eye gaze mapping M in step S26 ultimately satisfies the one or more predetermined criteria, the method is ended with step S30.

For example, it is here possible that an algorithm optimized for the best quality and fastest processing time be selected for each scene recording before the analysis and the actual determination of viewing direction mappings of images of the respective scene recording to a reference. The algorithm selection may thereby advantageously be performed as a function of the most varied factors, e.g., as a function of a classification according to market segment, field of application, special application, objective, situation, and/or question; as a function of features extracted from eye tracking data and/or from scene recordings and/or from reference and/or from metadata associated with these data; as a function of quality assessments of eye gaze mappings using one or more quality measures and/or quality classes; and as a function of intermediate results and/or partial results of algorithms executed previously or in parallel. The algorithm selection may thereby additionally be optimized with regard to specific, predetermined target specifications, e.g., target objects, target volumes, target areas or surfaces of interest, target price, or target quality or target time for the processing. Previous decisions may also be manually determined as boundary conditions for the system or the method, e.g., via expertise, and/or be automatically learned. The algorithm selection may also take place very flexibly on various levels—in particular, temporal levels—for example, for a respective study, a respective experiment, a respective recording, a respective analysis time interval, or a respective gaze event time interval, e.g., a fixation or saccade. A mixed algorithm selection may also be implemented in which, for example, individual analysis time interval reference pairs differ.

Overall, a method and a device for implementation of an eye gaze mapping are provided which, in numerous different situations and for numerous different application fields that can be specified via a parameter, enable the selection of an algorithm for implementation of the eye gaze mapping that is optimized for the respective situations.

REFERENCE LIST 10 person
12 scene
14 glasses
16 scene camera
18 object classes
20 bottle
22 background
24 device
26 control device
28 memory
30 input data
32 user interface
34 user input
A1, A2, A3 algorithm
B point of vision
B' mapped point of vision
BD gaze data
M eye gaze mapping
O1 first object class
O2 second object class
O3 third object class
P parameter
R reference
RD reference data
S scene recording
SD scene data

The invention claimed is:

1. A method comprising:
at a plurality of times, concurrently obtaining a scene image of a scene and a corresponding eye tracking measurement of a user;
determining an image quality characterizing the plurality of scene images;
determining, based on the plurality of scene images, a dynamism parameter of the scene;
in response to the image quality being less than a threshold quality, utilizing a first type of mapping to map a plurality of points of view of the user to a reference representation of the scene based on the plurality of scene images, the plurality of corresponding eye tracking measurements and the dynamism parameter; and
in response to the image quality being greater than the threshold quality, utilizing a second type of mapping to map the plurality of points of view of the user to the reference representation of the scene based on the plurality of scene images, the plurality of corresponding eye tracking measurements and the dynamism parameter.

2. The method of claim 1, further comprising:
in accordance with a determination that the dynamism parameter indicates a first value, mapping the plurality of points of view according to a first algorithm; and
in accordance with a determination that the dynamism parameter indicates a second value, mapping the plurality of points of view according to a second algorithm different than the first algorithm.

3. The method of claim 1, wherein determining the dynamism parameter of the scene includes classifying the scene into one of a plurality of predefined groups.

4. The method of claim 1, wherein the dynamism parameter indicates an amount of temporal variability of the scene.

5. The method of claim 1, wherein the dynamic parameter indicates whether the scene is a static scene or a moving scene.

6. The method of claim 5, further comprising:
in accordance with a determination that the dynamism parameter indicates that the scene is a moving scene, mapping the plurality of points of view according to a first algorithm; and
in accordance with a determination that the dynamism parameter indicates that the scene is a static scene, mapping the plurality of points of view according to a second algorithm that is more computationally efficient that the first algorithm.

7. The method of claim 1, wherein the dynamism parameter indicates whether a background of the scene is temporally unchanging or temporally variable.

8. The method of claim 7, further comprising:
in accordance with a determination that the dynamism parameter indicates that the background of the scene is temporally unchanging, mapping the plurality of points of view according to a first algorithm that ignores the background; and
in accordance with a determination that the dynamism parameter indicates that the background of the scene is temporally variable, mapping the plurality of points of view according to a second algorithm in which the background is analyzed.

9. The method of claim 1, wherein the dynamism parameter indicates objects of the scene that are moving or varying.

10. The method of claim 1, wherein mapping the plurality of points of view includes:
determining, based on the plurality of scene images of the scene and the plurality of corresponding eye tracking measurements, a corresponding plurality of viewpoints of a reference image of the scene.

11. The method of claim 10, wherein at least one of the plurality of scene images of the scene is from a different perspective than the reference image of the scene.

12. The method of claim 1, wherein the second type of mapping operates in a shorter time duration than the first type of mapping.

13. The method of claim 1, wherein the first type of mapping utilizes image analysis of a greater complexity than the second type of mapping.

14. An apparatus comprising:
a scene camera to capture a plurality of scene images of a scene;
an eye tracker to generate a plurality of corresponding eye tracking measurements concurrently obtained with the plurality of scene images of the scene; and
a processor to:
determine an image quality characterizing the plurality of scene images;
determine, based on the plurality of scene images, a dynamism parameter of the scene;
in response to the image quality being less than a threshold quality, utilize a first type of mapping to map a plurality of points of view of the user to a reference representation of the scene based on the plurality of scene images, the plurality of corresponding eye tracking measurements and the dynamism parameter; and
in response to the image quality being greater than the threshold quality, utilizing a second type of mapping to map the plurality of points of view of the user to the reference representation of the scene based on the plurality of scene images, the plurality of corresponding eye tracking measurements and the dynamism parameter.

15. The apparatus of claim 14, wherein the processor is to:
in accordance with a determination that the dynamism parameter indicates a first value, map the plurality of points of view according to a first algorithm; and
in accordance with a determination that the dynamism parameter indicates a second value, map the plurality of points of view according to a second algorithm different than the first algorithm.

16. The apparatus of claim 14, wherein the dynamism parameter indicates an amount of temporal variability of the scene.

17. The apparatus of claim 14, wherein the dynamic parameter indicates whether the scene is a static scene or a moving scene.

18. The apparatus of claim 14, wherein the dynamism parameter indicates whether a background of the scene is temporally unchanging or temporally variable.

19. A non-transitory computer-readable medium encoding instructions which, when executed, cause a processor to perform operations comprising:
at a plurality of times, concurrently obtaining a scene image of a scene and a corresponding eye tracking measurement of a user;
determining an image quality characterizing the plurality of scene images;
determining, based on the plurality of scene images, a dynamism parameter of the scene;
in response to the image quality being less than a threshold quality, utilizing a first type of mapping to map a plurality of points of view of the user to a reference representation of the scene based on the plurality of scene images, the plurality of corresponding eye tracking measurements and the dynamism parameter; and
in response to the image quality being greater than the threshold quality, utilizing a second type of mapping to map the plurality of points of view of the user to the reference representation of the scene based on the plurality of scene images, the plurality of corresponding eye tracking measurements and the dynamism parameter.

20. The non-transitory computer-readable medium of claim 19, wherein the operations further comprise:
in accordance with a determination that the dynamism parameter indicates a first value, mapping the plurality of points of view according to a first algorithm; and
in accordance with a determination that the dynamism parameter indicates a second value, mapping the plurality of points of view according to a second algorithm different than the first algorithm.

21. The non-transitory computer-readable medium of claim 19, wherein the dynamism parameter indicates an amount of temporal variability of the scene.

22. The non-transitory computer-readable medium of claim 19, wherein the dynamism parameter indicates whether a background of the scene is temporally unchanging or temporally variable.

* * * * *